United States Patent
Campagnolo

[11] Patent Number: 5,676,021
[45] Date of Patent: Oct. 14, 1997

[54] HANDLE-BAR FOR RACE BICYCLES, WITH DISPLAY DEVICE ON BRAKE CONTROL UNIT

[75] Inventor: Valentino Campagnolo, Vicenza, Italy

[73] Assignee: Campagnolo S.R.L., Vicenza, Italy

[21] Appl. No.: 601,151

[22] Filed: Feb. 13, 1996

[30] Foreign Application Priority Data

Jul. 4, 1995 [IT] Italy .................. TO95A0557

[51] Int. Cl.[6] .................. B62D 23/06; B62L 3/02
[52] U.S. Cl. .................. 74/489; 74/475; 74/502.2; 116/28.1; 340/432; 340/456
[58] Field of Search .................. 74/489, 488, 475, 74/502.2; 116/28.1; 340/432, 456

[56] References Cited

U.S. PATENT DOCUMENTS

| | | | |
|---|---|---|---|
| 4,435,983 | 3/1984 | Shimano | 73/493 |
| 4,780,864 | 10/1988 | Houlihan | 368/10 |
| 4,786,049 | 11/1988 | Lautenschlager | 272/73 |
| 4,859,984 | 8/1989 | Romano | 340/432 |
| 5,178,033 | 1/1993 | Kund | 74/502.2 X |
| 5,458,018 | 10/1995 | Kawakami | 74/502.2 |

FOREIGN PATENT DOCUMENTS 183849  4/1936  Switzerland .................. 340/432

*Primary Examiner*—Allan D. Herrmann
*Attorney, Agent, or Firm*—Sughrue,Mion,Zinn,Macpeak & Seas, PLLC

[57] ABSTRACT

A handle-bar for a race bicycle has a display device arranged on one appendage carried by the body supporting the brake lever.

5 Claims, 2 Drawing Sheets

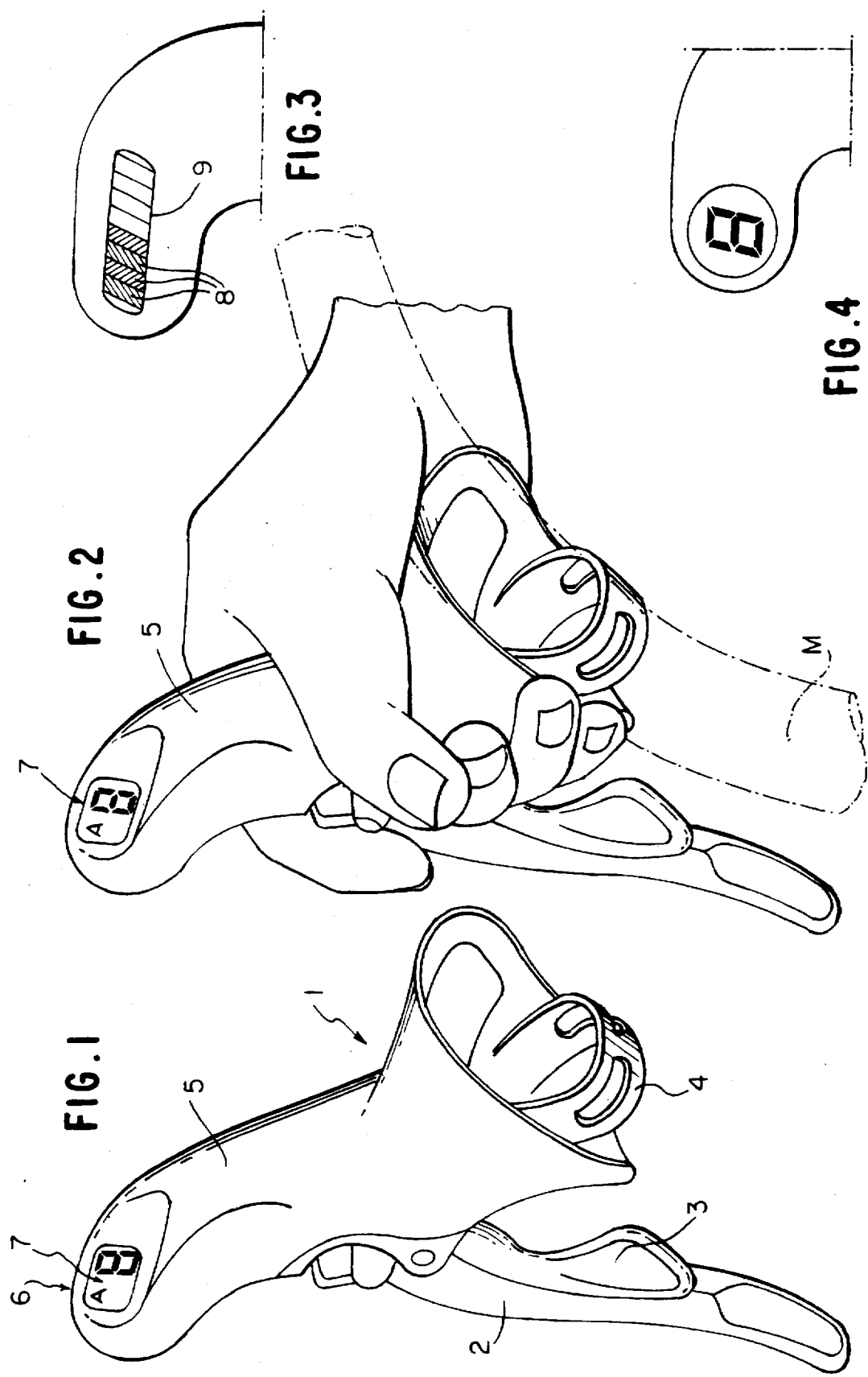

HANDLE-BAR FOR RACE BICYCLES, WITH DISPLAY DEVICE ON BRAKE CONTROL UNIT

BACKGROUND OF THE INVENTION

The present invention relates to handle-bars for race bicycles, of the type comprising a frame carrying a speed change control device, a display device and a bicycle brake control unit which includes a support body and a brake lever mounted on said support body.

According to the conventional art, a handle-bar of a race bicycle comprises two brake control devices for controlling the front brake and the rear brake respectively, each including a support body for the respective brake lever fixed to the handle-bar frame and a brake lever articulated to said body. Nowadays it is conventional to mount on the handle-bar, and particularly on the support body of the brake lever and/or on the brake lever, the device for controlling the rear derailleur and the front derailleur of the bicycle. Finally, it is also conventional to mount on the handle-bar frame a display device, for example associated to a computer for displaying various operative parameters such as speed, distance covered, etc. In the case of the so called mountain-bikes, it is further conventional to associate with the speed change control device a display device able to display the sprocket (in the case of the rear derailleur) or the crown wheel (in the case of the front derailleur) engaged by the bicycle chain.

The object of the present invention is that of providing a handle-bar for a race bicycle which has a display device arranged in a position which is optimized both because it is easily visible by the cyclist in any condition, and because it is never covered by the hands of the cyclist whichever is the technique adopted by the cyclist for gripping the handle-bar, the whole with a simple and unexpensive arrangement.

In order to achieve this object, the invention provides a handle-bar of the above indicated type, characterized in that said display device is arranged on said brake control unit. Preferably, the display device is used to display the speed ratio which is engaged.

In a preferred embodiment, which is advantageous in the case the speed change control device is carried by said body supporting the brake lever, said display device is arranged on said body supporting the brake lever. However, it is possible, alternatively, to provide for the display device to be mounted on the brake lever, or anyhow on a part moveable along with the brake lever. This variant may be advantageous in the case that the speed change control device is mounted on the brake lever.

Two display devices can be provided which are carried respectively by the two bodies supporting the brake levers, in order to display the sprocket and tooth crown engaged by the bicycle chain respectively, which are a function of the operative position of the rear derailleur and the front derailleur of the bicycle, respectively.

According to a further preferred feature of the present invention, said display device is arranged at one side of the brake unit, which faces towards the center of the handle-bar. This feature is particularly advantageous. Indeed, studies conducted by the Applicant have shown that in all the possible positions assumed by the hand of the cyclist when gripping the handle-bar, the only area which is never covered by the hand is just the area on the side of the brake unit facing towards the center of the handle-bar. Therefore, the arrangement at this area of the display device provided according to the present invention insures for visibility of the display device by the cyclist in any condition.

In the preferred embodiment of the invention, this display device is carried on one appendage extending from said body supporting the brake lever. For example, the appendage may be formed by a horn-shaped appendage including a base portion extending from said supporting body in a direction opposite to the respective brake lever, and one end portion curved towards the center of the handle-bar, which is used both for bearing said display device and for forming a further gripping portion of the handle-bar.

Due to these features, the advantage is obtained to arrange the display device in an ergonomically optimized position which is always easily visible by the cyclist, simultaneously to the advantage of defining a further gripping member which enables the cyclist to grip the handle-bar above the brake levers, in particular conditions which may render this attitude desirable. It is to be noted that there are already known in the art additional gripping members which can be used alternatively to the conventional gripping members at the ends of the handle-bar. However, in these known solutions, the additional gripping members are carried directly on the handle-bar, differently from what happens in the present invention, wherein they are carried by the body supporting each brake lever.

Naturally, the display device may be made in any known way. For example it can be an electronic display device connected to an electronic control unit of which the bicycle is provided, in the case for example of a bicycle provided with an electronically controlled motorized speed change. Or the display device can be an electronic display device associated to a conventional speed change control device, or yet it can be a display device mechanically connected to the speed change control device. This solution is particularly simple in the case, which is usual nowadays, in which the speed change control device is associated to the body supporting the brake lever.

As indicated already, the main advantage of the present invention lies in that the cyclist is able to read promptly the information of the display device whichever is the position of the hands of the cyclist on the bicycle handle-bar.

BRIEF DESCRIPTION OF THE DRAWINGS

Further features and advantages of the invention will become apparent from the description which follows with reference to the annexed drawings, given purely by way of non limiting example, in which:

FIG. 1 is a perspective view of the device supporting the brake lever which is part of the handle-bar according to the invention, FIG. 2 is a view identical to that of FIG. 1 which shows the device of FIG. 1 mounted on the handle-bar (shown with dotted line), FIGS. 3–6 show four variants of the solution shown in FIGS. 1, 2

DETAILED DESCRIPTION OF THE DRAWINGS

Figure 5:
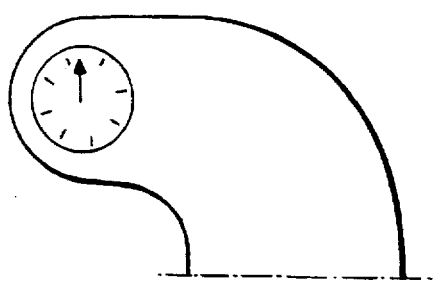

In FIGS. 1, 2, reference numeral 1 generally designates a device supporting the brake lever 2 of a race bicycle. The details of construction of the support device 1 as far as the connection to brake lever 2 is concerned are not illustrated herein since they can be made in any known way and they do not fall, taken alone, within the scope of the present invention. The case illustrated in FIG. 1 is that in which to the brake lever there is associated a further lever 3 which is used by the cyclist to control the speed change of the bicycle.

It is clearly apparent, however, that the invention is applicable to any type of device for supporting the brake lever, independently from the type of speed change control. Again according to the conventional art, the device 1 is provided with a clamp 4 for connection to the handle-bar M of a race bicycle. Also in this case the details relating to the fixing of device 1 to the handle-bar are not illustrated since they can be made in any known way.

In the illustrated example, body 1 has a horn-shaped appendage 5 extending in a direction opposite to that of brake lever 2, i.e. upwardly, with reference to FIG. 1, so as to form a further gripping member which can be used by the cyclist. However, even when the cyclist grips the handle-bar of the bicycle taking his hand on appendage 5 (FIG. 2), the upper end of this horn-shaped appendage 5 projects above the hand and therefore is clearly visible by the cyclist. According to the invention, this end portion 6, which is curved towards the inside of the handle-bar, has a display device 7 for displaying the speed ratio engaged by the bicycle speed change device. FIGS. 1, 2 refer to the case of an electronic display device 7 which shows simultaneously to the cyclist which is the pair front crown wheel-rear sprocket which has been selected. According to the conventional art, indeed, the bicycle is provided with a front derailleur and a rear derailleur which cause the selective engagement of the bicycle chain respectively on a plurality of crown wheels associated with the bicycle crank axle and a plurality of sprockets associated with the hub of the bicycle rear wheel. In the illustrated example, the sprockets mounted on the rear hub are indicated by a progressive number (for example from 1 through 8 in the case eight sprockets are mounted) whereas the crown wheels associated with the crank axle are indicated by a capital letter (for example A and B in the case two crown wheels are provided). Therefore, in the example illustrated in FIGS. 1, 2, the display device 7 shows that in this moment the chain engages the front crown wheel A and the rear sprocket 8.

Figure 6:
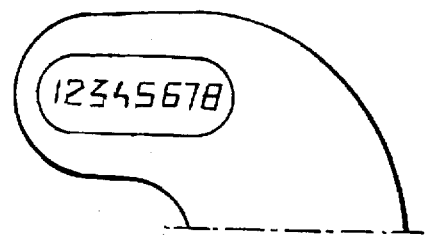

As already indicated, the display device 7 can be an electronic display device, for example connected to an electronic control device for a speed change driven by an electric motor, or a mechanical control device of the conventional type. FIG. 3 shows a variant with analogic rather than digital display, in which bars 8 are progressively lighted along a display line 9 to provide the cyclist with the information on the engaged speed ratio. FIG. 4 shows a further variant with digital display. FIG. 5 shows a dial-like analogic display, whereas FIG. 6 shows again a digital display, in which the digit showing the sprocket engaged by the chain are lighted selectively to provide the requested information to the cyclist.

Naturally, the display device may also be of a mechanical type, and mechanically connected to the speed change control device. In this case, there can be provided two separate display devices, respectively associated with the two bodies supporting the brake levers, which carry the mechanisms controlling the rear derailleur and the front derailleur.

As it is clearly apparent from the foregoing description, the arrangement on the body supporting the brake lever of an horn-shaped appendage 5 provides a surface which is clearly visible by the cyclist in any condition and at the same time adds a further gripping member to the handle-bar.

Figure 7:
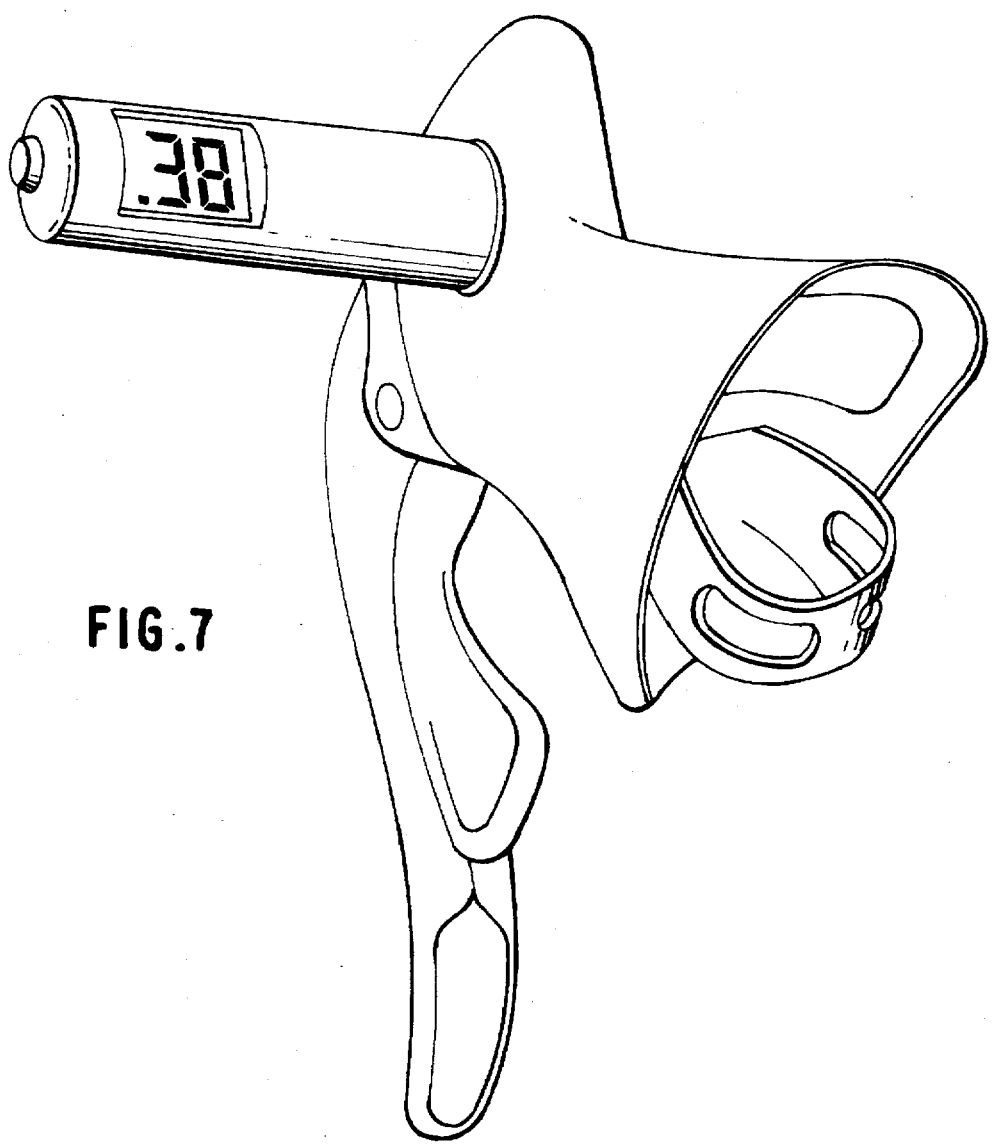
FIG. 7 shows a further variant of FIG. 1.

FIG. 7 shows a further variant of appendage 5, which in this case is formed by a separate body fixed to support device 1.

Naturally, while the principle of the invention remains the same, the details of construction and the embodiments may widely vary with respect to what has been described and illustrated purely by way of example, without departing from the scope of the present invention.

What is claimed is:

1. A handlebar for a race bike having a support device mounted on said handlebar, a brake lever supported on said support device and extending substantially vertically downwardly from said handlebar, an appendage having a base portion extending from said support device in a direction opposite to said brake lever and an end portion curved toward a center portion of said handlebar and an electronic display device mounted on said end portion.

2. A handlebar as set forth in claim 1 wherein said electronic display device is arranged to face towards the handlebar.

3. A handlebar as set forth in claim 1 further comprising a speed change control lever supported on said support device for changing a speed ratio engaged by the bicycle speed change device, said display device being used to display the speed ratio of the bicycle speed change device.

4. A handlebar as set forth in claim 1 wherein said display device is of a digital type.

5. A handlebar as set forth in claim 1 wherein said display device is an analogical type.

* * * * *